(12) United States Patent
Pati et al.

(10) Patent No.: US 10,781,763 B2
(45) Date of Patent: Sep. 22, 2020

(54) VEHICLE CONTROL SYSTEM

(71) Applicant: General Electric Company, Schenectady, NY (US)

(72) Inventors: Dibyajyoti Pati, Bangalore (IN); Ashish Anil Paralikar, Bangalore (IN); Sachin Shivajirao Kulkarni, Bangalore (IN); Darren Collins Gladney, Erie, PA (US)

(73) Assignee: GE GLOBAL SOURCING LLC, Norwalk, CT (US)

( * ) Notice: Subject to any disclaimer, the term of this patent is extended or adjusted under 35 U.S.C. 154(b) by 47 days.

(21) Appl. No.: 15/918,002

(22) Filed: Mar. 12, 2018

(65) Prior Publication Data

US 2018/0313282 A1 Nov. 1, 2018

Related U.S. Application Data

(60) Provisional application No. 62/491,234, filed on Apr. 27, 2017.

(51) Int. Cl.
*F02D 41/02* (2006.01)
*G05D 1/00* (2006.01)
(Continued)

(52) U.S. Cl.
CPC ....... *F02D 41/021* (2013.01); *F02D 41/1406* (2013.01); *G01C 21/3469* (2013.01);
(Continued)

(58) Field of Classification Search
CPC ............. F02D 41/021; F02D 2200/701; F02D 2200/703; F02D 2200/704; F02D 2250/26;
(Continued)

(56) References Cited

U.S. PATENT DOCUMENTS 5,561,602 A 10/1996 Bessler et al.
6,151,549 A * 11/2000 Andrews ............. F02D 41/0007
180/167
(Continued)

FOREIGN PATENT DOCUMENTS

DE 102013000367 A1 * 7/2014
JP 2001047892 A * 2/2001

OTHER PUBLICATIONS

Doe, "21st Century Locomotive Technology-Quarterly Technical Status Report 6", Report No. DOE-AL68284-TSR06, Aug. 31, 2004, pp. 1-6, downloaded from http://www.osti.gov/bridge/servlets/purl/829829-eB1sSN/829829.pdf (Year: 2004).*

(Continued)

*Primary Examiner* — Faris S Almatrahi
*Assistant Examiner* — David A Testardi
(74) *Attorney, Agent, or Firm* — The Small Patent Law Group LLC; Philip S. Hof

(57) ABSTRACT

A system includes one or more processors configured to obtain environmental data geographically and temporally corresponding to scheduled travel of a vehicle system. The one or more processors are further configured to determine a power output capability range for the vehicle system traveling during a trip based on the environmental data that is obtained. The one or more processors are also configured to communicate instructions to at least one of a propulsion system of the vehicle system or a vehicle controller of the vehicle system for controlling movement of the vehicle system during the trip such that the vehicle system produces a power output within the power output capability range as the vehicle system travels. The environmental data includes historical values of one or more of temperature, pressure, or air constituency in geographic areas through which the vehicle system will travel during the trip.

20 Claims, 7 Drawing Sheets

(51) Int. Cl.
  *G05D 1/02* (2020.01)
  *G01C 21/34* (2006.01)
  *F02D 41/14* (2006.01)

(52) U.S. Cl.
  CPC ......... *G05D 1/0005* (2013.01); *G05D 1/0088* (2013.01); *G05D 1/0217* (2013.01); *G05D 1/0223* (2013.01); *G05D 1/0276* (2013.01); *G05D 1/0293* (2013.01); *F02D 2041/1412* (2013.01); *F02D 2200/0414* (2013.01); *F02D 2200/0418* (2013.01); *F02D 2200/1002* (2013.01); *F02D 2200/701* (2013.01); *F02D 2200/703* (2013.01); *F02D 2250/18* (2013.01); *G05D 2201/0213* (2013.01)

(58) Field of Classification Search
  CPC ... G01C 21/3453; G01C 21/3469; G01L 3/24; G05D 1/0088; G05D 1/0217; G05D 1/0221; G05D 1/0223; G05D 1/0276; G05D 1/0278; G05D 1/0297; B61L 3/006; B61L 27/0016; B61L 27/0027; B60L 15/2045; B60L 2240/44; B60L 2260/54; B61C 17/12
  See application file for complete search history.

(56) References Cited

U.S. PATENT DOCUMENTS

| | | | | |
|---|---|---|---|---|
| 7,013,205 | B1* | 3/2006 | Hafner | B60L 15/2045 701/22 |
| 8,370,007 | B2* | 2/2013 | Brooks | B61L 3/006 180/170 |
| 9,067,589 | B1* | 6/2015 | Zhao | B60W 10/06 |
| 9,157,352 | B2 | 10/2015 | Mischler et al. | |
| 9,229,448 | B1* | 1/2016 | Luther | G01C 21/00 |
| 9,233,680 | B2 | 1/2016 | Daum | |
| 10,183,683 | B2* | 1/2019 | Lavertu | B61L 3/006 |
| 2005/0109882 | A1* | 5/2005 | Armbruster | B61L 3/006 246/167 R |
| 2005/0251299 | A1* | 11/2005 | Donnelly | B60L 7/08 701/19 |
| 2007/0203619 | A1* | 8/2007 | Ingram | F02D 41/1497 701/3 |
| 2007/0219680 | A1* | 9/2007 | Kumar | B61L 3/006 701/19 |
| 2007/0219682 | A1* | 9/2007 | Kumar | B61L 3/006 701/19 |
| 2008/0202376 | A1* | 8/2008 | Meltser | F02D 41/0205 105/26.05 |
| 2008/0270023 | A1* | 10/2008 | Kumar | B60L 15/2045 701/22 |
| 2010/0174484 | A1* | 7/2010 | Sivasubramaniam | B60L 7/10 701/469 |
| 2011/0024211 | A1* | 2/2011 | Kikuchi | B60K 6/445 180/65.25 |
| 2011/0313647 | A1* | 12/2011 | Koebler | B60L 15/2045 701/123 |
| 2013/0001370 | A1* | 1/2013 | Uzkan | B61C 17/12 246/186 |
| 2013/0231798 | A1* | 9/2013 | Zurawski | B60W 30/182 701/1 |
| 2014/0180511 | A1* | 6/2014 | Daum | B60W 20/00 701/22 |
| 2014/0277835 | A1* | 9/2014 | Filev | G01C 21/3469 701/2 |
| 2014/0358339 | A1* | 12/2014 | Cooper | B61L 3/006 701/20 |
| 2015/0134156 | A1* | 5/2015 | Henry | B61C 17/12 701/19 |
| 2016/0075333 | A1* | 3/2016 | Sujan | B60W 30/10 701/25 |
| 2016/0320784 | A1* | 11/2016 | Sunley | G05F 1/66 |
| 2017/0088119 | A1* | 3/2017 | Zhang | B60W 20/15 |
| 2019/0106132 | A1* | 4/2019 | Lavertu | B61L 3/006 |

OTHER PUBLICATIONS

Salasoo, Lembit, "Heavy vehicle systems optimization program: FY 2004 Annual Report", U.S. Department of Energy, Section VIII.A.., "21st Century Locomotive Technology", Feb. 2005, pp. 156-163, downloaded from https://www1.eere.energy.gov/vehiclesandfuels/pdfs/program/2004_hv_optimization.pdf (Year: 2005).*
Doe, "21st Century Locomotive Technology, Quarterly Technical Status Report 11", Report No. DOE-AL68284-TSR11, Feb. 14, 2006, pp. 1-8, downloaded from http://www.osti.gov/energycitations/servlets/purl/876101-8xDULv/876101.pdf (Year: 2006).*
Wikipedia article, "Public transport timetable", Old revision dated Dec. 9, 2016, 7 pages (Year: 2016).*
Sodre, J.R., "Comparison of engine power correction factors for varying atmospheric conditions", Journal of Brazilian Society of Mechanical Sciences & Engineering, JBSMSE, Jul.-Sep. 2003, pp. 279-285. (Year: 2003).*
SAE Surface Vehicle Standard J1349 (Engine power test code), Revised Aug. 2004, 23 pages. (Year: 2004).*
Lab sheet, "ME 410—Performance characteristics of an internal combustion engine", Experiment No. : 4 Spring 2012 V2, 22 pages, downloaded from: http://courses.me.metu.edu.tr/courses/me410/exp4/ME410%20Labsheet_Exp4_%20Fall%202011.pdf (Year: 2012).*

* cited by examiner

| | | Barometric Pressure | | |
|---|---|---|---|---|
| | | X | Y | Z |
| Temperature | A | (1) | (2) | (3) |
| | B | (4) | (5) | (6) |
| | C | (7) | (8) | (9) |

FIG. 5

VEHICLE CONTROL SYSTEM

CROSS-REFERENCE TO RELATED APPLICATIONS

This application claims priority to U.S. Provisional Patent Application No. 62/491,234, which was filed 27 Apr. 2017, and the entire disclosure of which is incorporated herein by reference.

FIELD

Embodiments of the subject matter described herein relate to controlling operations of a vehicle system.

BACKGROUND

Some known vehicle systems include one or more engines that consume fuel and air (e.g., oxygen) to generate propulsive force and travel along routes during trips. When planning how a vehicle system will travel during an upcoming scheduled trip, there is a general assumption that the one or more engines of the vehicle system will be able to provide uniform power delivery throughout the duration of the trip, at least through open areas outside of tunnels and other airflow-restricted areas. For example, it is generally assumed that the vehicle system will have sufficient oxygen supply and ventilation as the vehicle system travels through open areas to enable the engines to consistently provide power outputs corresponding to the horsepower ratings of the engines.

This general assumption is often not true, however, as engines may experience deration during a trip. The engine is not capable of providing a power output at the horsepower rating of the engine when an engine experiences deration. The varying engine capability may be caused by various environmental and internal changes experienced by the engine during the trip, such as changes in elevation (or altitude), air quality, oxygen concentration in the air, ambient temperature, ambient pressure, ambient humidity, fuel quality, and/or engine conditions. Since the movement of the vehicle system during a trip may be planned in advance, such plans may assume uniform engine performance without accounting for the variations in engine performance experienced at different times and locations during the trip. As a result, the movement planning may not accurately match the capabilities of the vehicle system, which can lead to increasing discrepancies between the movement plan and the actual performance of the vehicle system during a trip. If the vehicle system was being controlled automatically based on the movement plant, an operator may have to take manual control of the vehicle system due to the discrepancy between the planned movement and the actual movement caused by unaccounted engine deration.

BRIEF DESCRIPTION

In one embodiment, a system (e.g., for controlling a vehicle system) is provided that includes one or more processors configured to obtain environmental data geographically and temporally corresponding to scheduled travel of a vehicle system. The one or more processors are further configured to determine a power output capability range for the vehicle system traveling during a trip based on the environmental data that is obtained. The one or more processors are also configured to communicate instructions to at least one of a propulsion system of the vehicle system or a vehicle controller of the vehicle system for controlling movement of the vehicle system during the trip such that the vehicle system produces a power output within the power output capability range as the vehicle system travels. The environmental data includes historical values of one or more of temperature, pressure, or air constituency in geographic areas through which the vehicle system will travel during the trip.

In another embodiment, a system (e.g., for controlling a vehicle system) is provided that includes one or more processors further configured to predict, using a predictive deration model, whether or not a first vehicle system scheduled to travel along a route during a trip will experience a deration event at a designated geographic area during the trip. The predictive deration model is generated based on historical data of deration events experienced by plural vehicle systems. The historical data includes geographic areas of the deration events, times of the year that the deration events were experienced, and vehicle characteristics of the vehicle systems that experienced the deration events. The one or more processors are further configured to communicate instructions to control movement of the first vehicle system during the trip based on the prediction such that the first vehicle system does not experience the deration event at the designated geographic area during the trip.

In another embodiment, a system (e.g., for controlling a vehicle system) is provided that includes one or more processors configured to obtain environmental data geographically and temporally corresponding to a scheduled trip of a vehicle system. The environmental data represents historical values of one or more of temperature, pressure, or air constituency in geographic areas through which the vehicle system will travel during the trip and a time of year during which the vehicle system is scheduled to travel through the geographic areas on the trip. The one or more processors are configured to determine power output capability ranges for the vehicle system during the trip based on the environmental data. Each power output capability range corresponds to a different one of the geographic areas through which the vehicle system will travel. The one or more processors are configured to communicate instructions to control movement of the vehicle system during the trip such that, as the vehicle system travels through the different geographic areas during the trip, the vehicle system produces power outputs that are within the power output capability ranges associated with the corresponding geographic areas.

BRIEF DESCRIPTION OF THE DRAWINGS

The subject matter described herein will be better understood from reading the following description of non-limiting embodiments, with reference to the attached drawings, wherein below:

FIG. 5 is a table illustrating an engine performance map for an engine of the propulsion system of the vehicle system;

DETAILED DESCRIPTION

Figure 1:
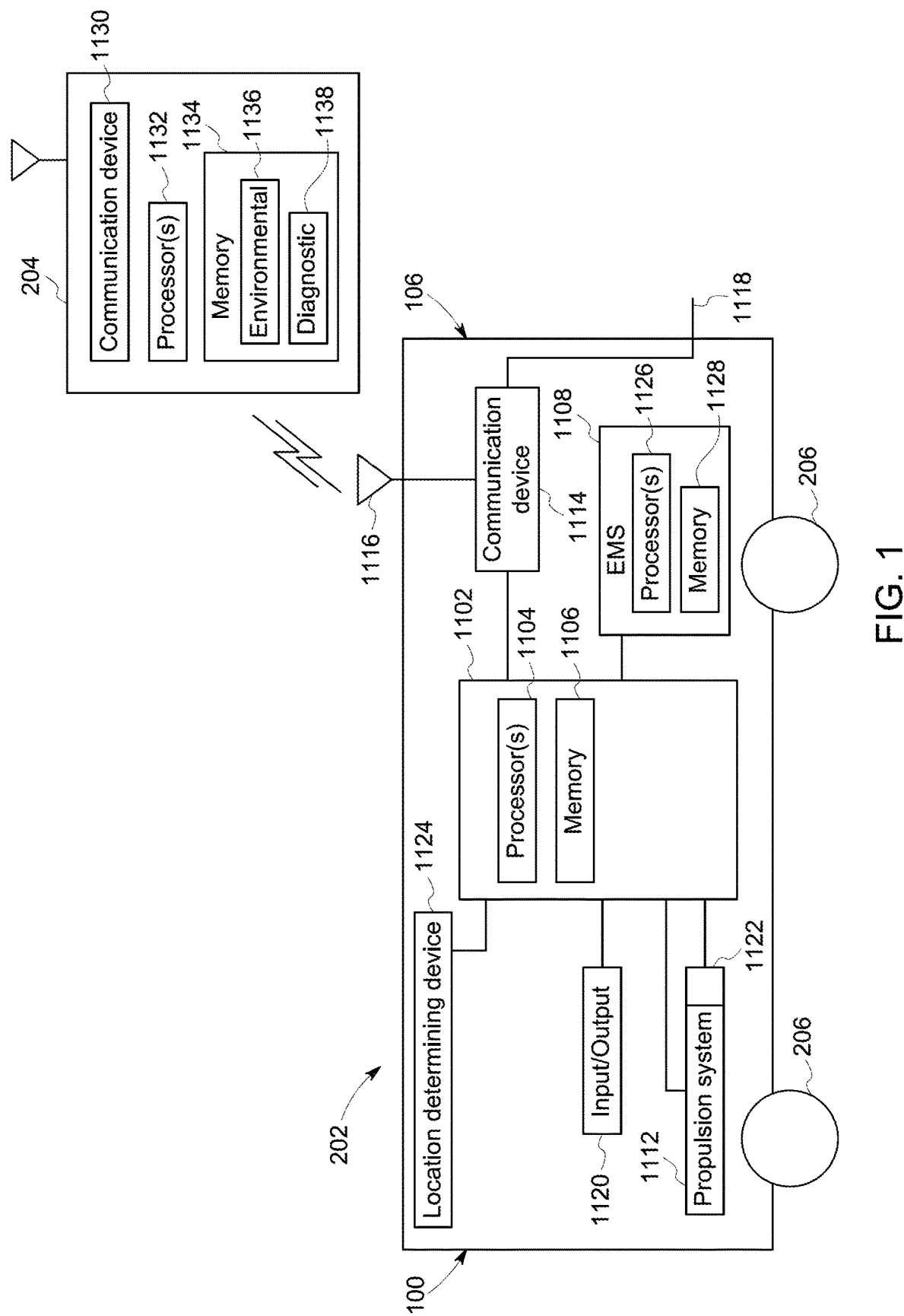
FIG. 1 is a schematic diagram of one embodiment of a vehicle control system for controlling movement of a vehicle system during a trip.

One or more embodiments of the inventive subject matter described herein provide systems and methods that control a vehicle system along a trip. For example, one or more embodiments describe a system and method for predicting potential engine deration in a particular section of a trip, such as in a particular geographic area. The predicted engine deration can be taken into account to control the movement of the vehicle system as the vehicle system travels through the particular section of the trip. For example, the vehicle system may be controlled to reduce the likelihood of experiencing deration through that section of the trip. Reducing the likelihood of experiencing engine deration means that the vehicle system experiences fewer deration events or occurrences during a trip when controlled according to the methods and systems described herein, as compared to a number of deration events that the vehicle system would experience when controlled by another trip plan or by manual control of an operator. Therefore, the vehicle system controlled according to the methods and systems described herein may not experience any deration events during the trip or many experience a non-zero number of deration events that is fewer than the number of deration events that the vehicle system would experience when not controlled by the methods and systems described herein.

Optionally, the vehicle system may be controlled to reduce the likelihood of experiencing deration by modifying a distribution of designated power outputs provided by multiple propulsion-generating vehicles in the vehicle system, by reducing the designated power output to be provided by one or more propulsion-generating vehicles relative to a planned power output to be provided by the propulsion-generating vehicles, by changing the number and/or type of propulsion-generating vehicles in the vehicle system, or the like. The predicted potential engine deration may be considered in the generation or selection of a trip plan that designates operational settings (e.g., throttle settings, brake settings, speed limits, etc.) for controlling the movement of the vehicle system during the trip. As a result, the vehicle system traveling along a route during the trip according to the trip plan may have a reduced likelihood of experiencing deration relative to movement of the vehicle system according to manual control and/or a trip plan that does not account for potential engine deration at particular sections of the trip. Furthermore, since the trip plan accounts for potential engine deration, the trip plan may more accurately match the actual movement of the vehicle system during the trip relative to a trip plan that does not account for variations in engine performance due to deration.

In another example, one or more embodiments describe a system and method for determining a power output capability range that the vehicle system is capable of providing at different particular sections of the trip, such as particular geographic areas along the route. The determined power output capability range accounts for deration, and is more accurate than assuming that an engine is able to provide uniform power output at the rated horsepower of the engine along each of the various sections of the trip. The determined power output capability range may be based on environmental conditions experienced by the vehicle system in the particular section of the trip and vehicle characteristics. The determined power output capability range may be used to control movement of the vehicle system during the trip, such that an engine of the vehicle system is not controlled to exceed the power output capability range for a designated section of the trip. As a result, the engine is less likely to experience a deration event in which the engine is not capable of providing a requested power output and provides a reduced power output less than the requested power output.

The determined power output capability range may be used in the generation or selection of a trip plan that designates operational settings for controlling the movement of the vehicle system during the trip. The trip plan may be generated or selected using the determined power output capability ranges for different sections of the trip as constraints, such that the throttle settings designated by the trip plan for a particular section of the trip do not cause the actual power output provided by an engine to exceed the power output capability range for that particular section of the trip. When compared to trip plans that do not account for variations in engine capability due to deration, the trip plan based on the determined power output capability ranges may more accurately match the actual movement of the vehicle system during the trip, resulting in improved vehicle system handling and reduced reliance on manual input.

The systems and method described herein can be used for controlling various types of vehicle systems, such as trains, automobiles (e.g., autonomous cars and trucks), off-highway vehicles, marine vessels, and the like. Each vehicle system that is controlled by the systems and methods described herein may include only a single vehicle or multiple vehicles. In the vehicle systems with multiple vehicles, the vehicles may be mechanically and/or logically coupled together to move together along a route.

FIG. 1 is a schematic diagram of one embodiment of a vehicle control system 202 for controlling movement of a vehicle system 100 during a trip. The vehicle system 100 in the illustrated embodiment includes a propulsion-generating vehicle 106. The propulsion-generating vehicle 106 can generate propulsive force to propel the vehicle system 100 along a route. The propulsion-generating vehicle 106 may represent a locomotive, an off-highway vehicle (e.g., a vehicle not designed for or permitted to travel on public roadways), automobiles (e.g., cars and trucks that are designed for traveling on public roadways), marine vessels, or the like. The propulsion-generating vehicle 106 may represent the entire vehicle system 100, or alternatively may represent one vehicle of multiple vehicles of the vehicle system 100.

The vehicle control system 202 is at least partially disposed on the propulsion-generating vehicle 106. For example, as described herein, the vehicle control system 202 may be entirely disposed onboard the vehicle system 100, or at least a portion of the vehicle control system 202 may be located off-board the vehicle system 100, such as at a dispatch facility 204. The vehicle control system 202 is configured to control operations of the vehicle system 100 along the route during a trip. For example, the vehicle control system 202 may control movement of the vehicle system 100 to account for variations in engine capability of the vehicle system 100 at particular sections of the trip, such as to provide more accurate control of the vehicle system 100 and/or to avoid experiencing deration events.

As referred to herein, "deration" and "deration events" refer to situations in which an engine is not capable of producing a power output that corresponds to the rated or designed horsepower of the engine. The engine experiencing the deration event therefore has a reduced power output capability relative to the rated power output. The deration can be caused by various factors, such as a limited amount of oxygen available for combustion, high engine temperatures, poor fuel quality, poor engine health or other conditions of the engine, and the like. The oxygen concentration in the air may be limited due to, for example, a low ambient air pressure resulting from a relatively high altitude or elevation and/or poor air quality caused by a high concentration of exhaust gases in the air. The high engine temperatures may be caused by a relatively high ambient air temperature and/or a reduced ability to dissipate heat from the engine. During a deration event, the engine may only be able to produce a fraction of the rated power output (also referred to as horsepower), such as 60%, 75%, or 90% of the rated power output. Therefore, an operational setting for a particular section of a trip may designate that the engine provide throttle setting (e.g., notch setting) 8, but the actual power generated by the engine may correspond to throttle setting 6 if the engine is derated and not able to produce the greater power output. Due to the reduced propulsion provided by the engine, the vehicle system does not move as controlled (e.g., desired or commanded) when experiencing a deration event. Engine deration is undesirable due to the reduced control of the vehicle system and the reduced performance capability of the vehicle system.

The propulsion-generating vehicle 106 includes a propulsion system 1112, which includes one or more engines that consume fuel and oxygen to generate power for propelling the vehicle system 100 along a route, such as a track, a road, a waterway, an off-road path, or the like. For example, the one or more engines may combust fuel and oxygen to drive a piston in a cylinder, to rotate a shaft, or the like to generate a propulsive force. Additionally, or alternatively, the engines may combust fuel and oxygen to generate electric current to power one or more traction motors, which generate the propulsive force. The propulsive force is used to rotate axles and wheels 206 of the vehicle system 100 to move the vehicle system 100 along the route. The propulsion system 1112 is configured to provide both tractive effort to propel the vehicle system 100 and braking effort to slow and/or stop the vehicle system 100. For example, in addition to the one or more internal combustion engines and traction motors, the propulsion system 1112 may include one or more brakes, batteries, generators, alternators, cooling systems (e.g., radiators, fans, etc.), and the like. The propulsion system 1112 may also include electric components that power the traction motors using electric energy obtained from an onboard storage device (e.g., batteries) and/or an off-board source (e.g., a catenary and/or electrified rail), such as transformers, converters, inverters, and the like. The propulsion-generating vehicle 106 optionally may have a hybrid propulsion system that includes motors powered by both fuel-consuming engines and an onboard or off-board source of electric current.

One or more propulsion sensors 1122 may be operatively connected with the propulsion system 1112 in order to obtain data representative of operational parameters of the propulsion system 1112. For example, the sensors 1122 may include one or more of an oxygen sensor that measures the fuel-to-oxygen ratio within the engine, a mass air flow sensor that measures the amount of air flow into the engine, a temperature sensor that measures the temperature of an engine coolant, such as water, a position sensor that measures revolutions per minute of a crankshaft of the engine, a dynamometer that measures torque of the engine to determine the power output (or horsepower) provided by the engine, an electrical voltage sensor that measures an electrical current provided by a generator or alternator of the propulsion system 1112, or other sensors. The vehicle 106 also includes at least one input device and output device, which optionally may be integrated together as a single input/output device 1120. The input device may include a keyboard, pedal, button, lever, microphone, touchscreen, or the like, and the output device may include a speaker, a display screen, a light, or the like. The input/output device 1120 may be used by an operator to provide input and/or monitor output of the vehicle 106 and/or the vehicle system 100 during a trip. The input/output device 1120 may also be used by an operator to select or modify a trip plan for the vehicle system 100 during the trip, as described in more detail herein.

The vehicle 106 includes an onboard vehicle controller 1102 that controls operations of the vehicle 106 and/or the vehicle system 100. For example, the vehicle controller 1102 may convey control signals to the propulsion system 1112 to control the tractive and braking efforts of the propulsion system 1112. In an embodiment in which the vehicle system 100 includes multiple propulsion-generating vehicles 106 (e.g., the embodiment shown in FIG. 2), each of the propulsion-generating vehicles 106 may include a respective vehicle controller 1102. Alternatively, only one of the multiple propulsion-generating vehicles 106 includes the vehicle controller 1102, and that vehicle controller 1102 may communicate control signals to the other propulsion-generating vehicles 106 to control the propulsion systems 1112 on those vehicles 106.

The vehicle controller 1102 may include one or more processor(s) 1104 and/or other logic-based device(s) that perform operations based on instructions stored on a tangible and non-transitory computer readable storage medium or memory 1106. The controller 1102 may additionally or alternatively include one or more hard-wired devices that perform operations based on hard-wired logic of the devices. The controller 1102 may represent the hardware that operates based on software or hardwired instructions, the software that directs hardware to perform the operations, or a combination thereof.

The propulsion-generating vehicle 106 includes a location determining device 1124 that determines a location of the vehicle 106 as the vehicle system 100 travels along the route during a trip. The location determining device 1124 may be a global positioning system (GPS) receiver that obtains location data (e.g., coordinates) representative of the location of the vehicle 106. The one or more processors 1104 of the controller 1102 are communicatively coupled, via one or more wired or wireless connections, to the location determining device 1124 and are configured to analyze the location data to determine the location of the vehicle 106 at various times during a trip. The one or more processors 1104 may compare the location data of the vehicle 106 to a map or trip schedule to determine a level of progress of the vehicle system 100 along the route and/or a proximity of the vehicle system 100 to one or more locations of interest, such as a destination.

The propulsion-generating vehicle 106 also includes a communication device 1114. The communication device 1114 can communicate with an off-board location, such as another vehicle system, a dispatch facility 204, another vehicle in the same vehicle system 100, a wayside device (e.g., transponder), or the like. The communication device 1114 can communicate with the off-board location via wired and/or wireless connections (e.g., via radio frequency). The communication device 1114 can include a wireless antenna 1116 and associated circuitry and software to communicate wirelessly. For example, the communication device 1114 may include a transceiver, or separate receiver and transmitter components. Additionally or alternatively, the communication device 1114 may be connected with a wired connection via a cable 1118 to another vehicle in the vehicle system 100. For example, the cable 1118 may be a trainline, a multiple unit cable, an electronically-controlled pneumatic brake line, or the like. The communication device 1114 can be used to communicate (e.g., broadcast or transmit) a variety of information described herein. For example, the communication device 1114 can communicate control signals to other propulsion-generating vehicles 106 of the vehicle system 100, data representative of operational parameters of the propulsion system 1112 that is obtained by the sensors 1122, etc. The communication device 1114 can also be used to receive information from an off-board, remote location, such as environmental data, diagnostic data, remote control signals, trip schedules, and/or remotely-generated trip plans.

The propulsion-generating vehicle 106 further includes an energy management system ("EMS" in FIG. 1) 1108 communicatively coupled with the vehicle controller 1102 via a wired or wireless connection. The energy management system 1108 can generate or create a trip plan and/or select a previously-created trip plan. The trip plan designates operational settings of the vehicle system 100 (e.g., throttle settings, power outputs, speeds, brake settings, and the like) as a function of at least one of location, time elapsed, or distance traveled along the route during a specific trip. A trip plan differs from a trip schedule. For example, the trip schedule may specify the route to travel and at what times the vehicle system 100 is to be at one or more particular locations along the route, such as when to arrive at a destination location. The trip plan, however, may designate operational settings to control how the vehicle system 100 moves along the route. The trip plan is configured to allow the vehicle system to achieve one or more goals, such as arriving by a scheduled arrival time of the schedule, reducing fuel consumption, and/or reducing total travel time to complete a trip, while abiding by designated external constraints. The external constraints may be limits on the amount of fuel consumed, the amount of emissions generated, speed limits, vehicle acceleration capability limits, noise limits, and the like. As an example, the vehicle system 100 traveling along the route from a starting location to a destination location within a designated time according to a trip plan may consume less fuel or produce fewer emissions than the same vehicle system 100 traveling along the same route from the same two locations, but according to another trip plan or according to manual control of the vehicle system 100. One or more examples of trip plans (also referred to as mission plans or trip profiles) and how the trip plans are determined are provided in U.S. patent application Ser. No. 11/385,354, the entire disclosure of which is incorporated by reference.

The energy management system 1108 may represent a hardware and/or software system that operates to perform one or more functions described herein. For example, the energy management system 1108 may include one or more processor(s) 1126 and/or other logic-based device(s) that perform operations based on instructions stored on a tangible and non-transitory computer readable storage medium or memory 1128. The energy management system 1108 may additionally or alternatively include one or more hard-wired devices that perform operations based on hard-wired logic of the devices. The energy management system 1108 may represent the hardware that operates based on software or hardwired instructions, the software that directs hardware to perform the operations, or a combination thereof.

The energy management system 1108 can generate a trip plan, retrieve and select a trip plan stored in the memory 1128 (or the memory 1106 of the vehicle controller 1102), and/or receive a trip plan from an off-board location via the communication device 1114. The vehicle controller 1102 (e.g., the one or more processors 1104) can refer to the trip plan in order to determine the designated throttle settings and/or power outputs to be generated by the one or more propulsion-generating vehicles 106 of the vehicle system 100 during the trip.

The dispatch facility 204 is located off-board and remote from the vehicle system 100. The dispatch facility 204 includes a communication device 1130 that is able to wirelessly communicate with the vehicle system 100 via the communication device 1114. The communication device 1130 may be similar to the communication device 1114, such as including an antenna, transceiver, and associated circuitry. In the illustrated embodiment, the dispatch facility 204 includes one or more processors 1132 and a tangible and non-transitory computer readable storage medium or memory 1134. The memory 1134 may include various databases, such as an environmental database 1136 and a diagnostic database 1138. The one or more processors 1132 are configured to access the memory 1134 and retrieve data from one or more of the environmental database 1136 or the diagnostic database 1138. The one or more processors 1132 may control the communication device 1130 to wirelessly communicate the data to the vehicle system 100, as described in more detail herein. The one or more processors 1132 may also be configured to store data received by the communication device 1130 into one or both of the databases 1136, 1138. The dispatch facility 204 shown in FIG. 1 may broadly represent any processing device that is off-board the vehicle system 100 and able to communicate with the vehicle system 100 to perform the functions described herein.

In an embodiment, the vehicle control system 202 is configured to control the movement of the vehicle system 100 during a trip based on determined power output capability ranges of the engines of the propulsion system 1112 at different geographic areas along the route. The power output capability ranges are determined by the vehicle control system 202 by accounting for variations in performance capability (e.g., deration) of the engines as the vehicle system 100 travels through the different geographic areas. For a given geographic area, the power output capability range that is determined may be equal to or less than the rated power output or horsepower of the engine.

Figure 2:
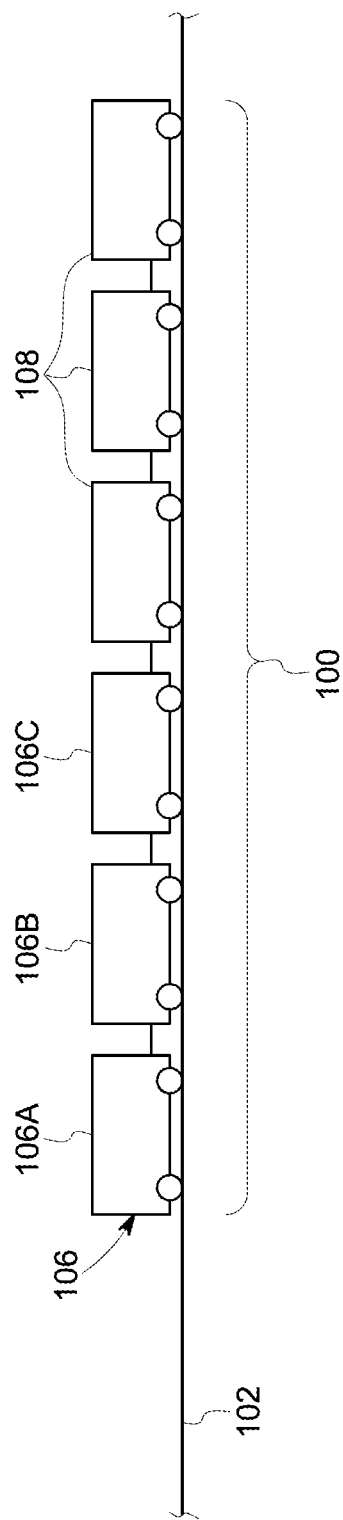
FIG. 2 illustrates a schematic diagram of a vehicle system traveling along a route according to an embodiment.

FIG. 2 illustrates a schematic diagram of the vehicle system 100 traveling along a route 102 according to an embodiment. The vehicle system 100 includes multiple vehicles 106, 108 that travel together along the route 102. The vehicles 106, 108 are mechanically connected with each other, such as by couplers, to form a string of vehicles. In an alternative embodiment, the vehicles 106, 108 are not mechanically connected to each other, but rather are logically and operationally connected via a communication network that controls the vehicles 106, 108 to travel together along the route 102 with a designated spacing between adjacent vehicles 106, 108. The vehicle system 100 in an embodiment may be a train that includes at least one locomotive representing the propulsion-generating vehicle 106 and at least one rail car mechanically coupled to the locomotive. In other embodiments, the vehicle system 100 may be one or more automobiles, such as trucks. For example, the propulsion-generating vehicle 106 may represent a tractor of a tractor trailer truck that pulls one or more passive trailers (which may represent other vehicles of the vehicle system 100).

The propulsion-generating vehicles 106 in the illustrated embodiment include a lead propulsion-generating vehicle 106A, a trail propulsion-generating vehicle 106C, and an intermediate propulsion-generating vehicle 106B disposed between the lead and trail vehicles 106A, 106C. Although the propulsion-generating vehicles 106A-C are shown as being directly coupled with each other, two or more of the propulsion-generating vehicles 106A-C may be separated from one another by one or more of the vehicles 108 in an alternative embodiment. The vehicle system 100 can coordinate the operations of the propulsion-generating vehicles 106 as the vehicle system 100 travels along the route 102 during a trip.

The vehicles 108 represent non-propulsion-generating vehicles incapable of generating propulsive force to propel the vehicle system 100 along the route 102. The non-propulsion-generating vehicles 108 may be used for carrying cargo and/or passengers. The non-propulsion-generating vehicles 108 may be rail cars, trailers, or other vehicle units that are propelled along the route 102 by the propulsion-generating vehicles 106. The group of propulsion-generating vehicles 106 may represent a vehicle consist. While three propulsion-generating vehicles 106 and three non-propulsion-generating vehicles 108 are shown in the illustrated embodiment, the vehicle system 100 may have different numbers and/or arrangements of the propulsion-generating vehicles 106 and the non-propulsion-generating vehicles 108 in alternative embodiments.

Figure 3:
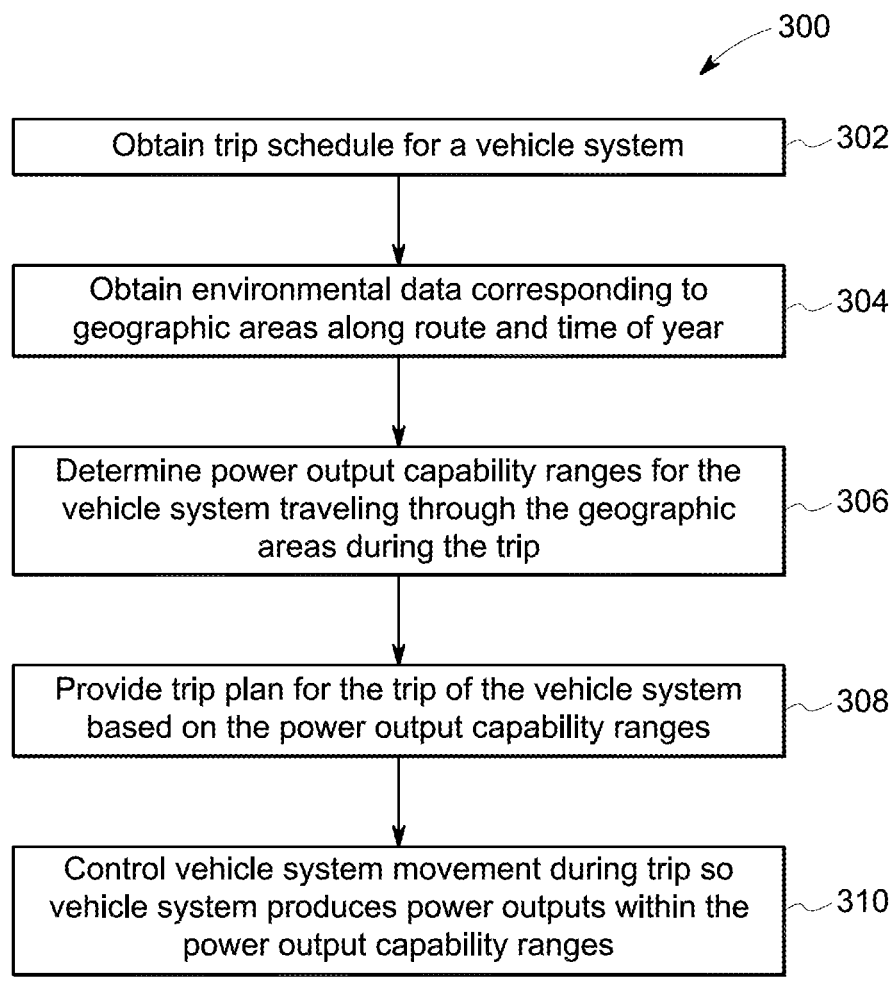
FIG. 3 is a flowchart of one embodiment of a method for controlling a vehicle system along a route during a trip.

FIG. 3 is a flowchart of one embodiment of a method 300 for controlling a vehicle system along a route during a trip. The method 300 is described in connection with the vehicle control system 202 as shown in FIG. 1. For example, in one embodiment the method 300 can be performed in full by the one or more processors 1126 of the energy management system 1108. In alternative embodiments, the method 600 can be performed in full or in part by the one or more processors 1104 of the vehicle controller 1102 and/or the one or more processors 1132 of the dispatch facility 204.

At 302, a trip schedule is obtained for a scheduled trip of a vehicle system. The trip schedule identifies the route and the date that the trip occurs. At 304, environmental data is obtained that corresponds to different geographic areas along the route of the trip and the time of the year in which the trip occurs. The environmental data is used to predict the environmental conditions that the vehicle system will experience at various geographic areas along the trip. The trip may cover a relatively long distance, such as up to or exceeding 500 miles. Due to the long distance of the trip, some geographic areas along the route may have different environmental conditions than other geographic areas along the route, such as a different ambient temperature, a different ambient pressure, a different elevation, a different humidity, and the like. Furthermore, the environmental conditions experienced by the vehicle system on the route are also based on the time of the year. A vehicle system traveling through a particular geographic area along the route may experience a different ambient temperature in July than in January.

Figure 4:
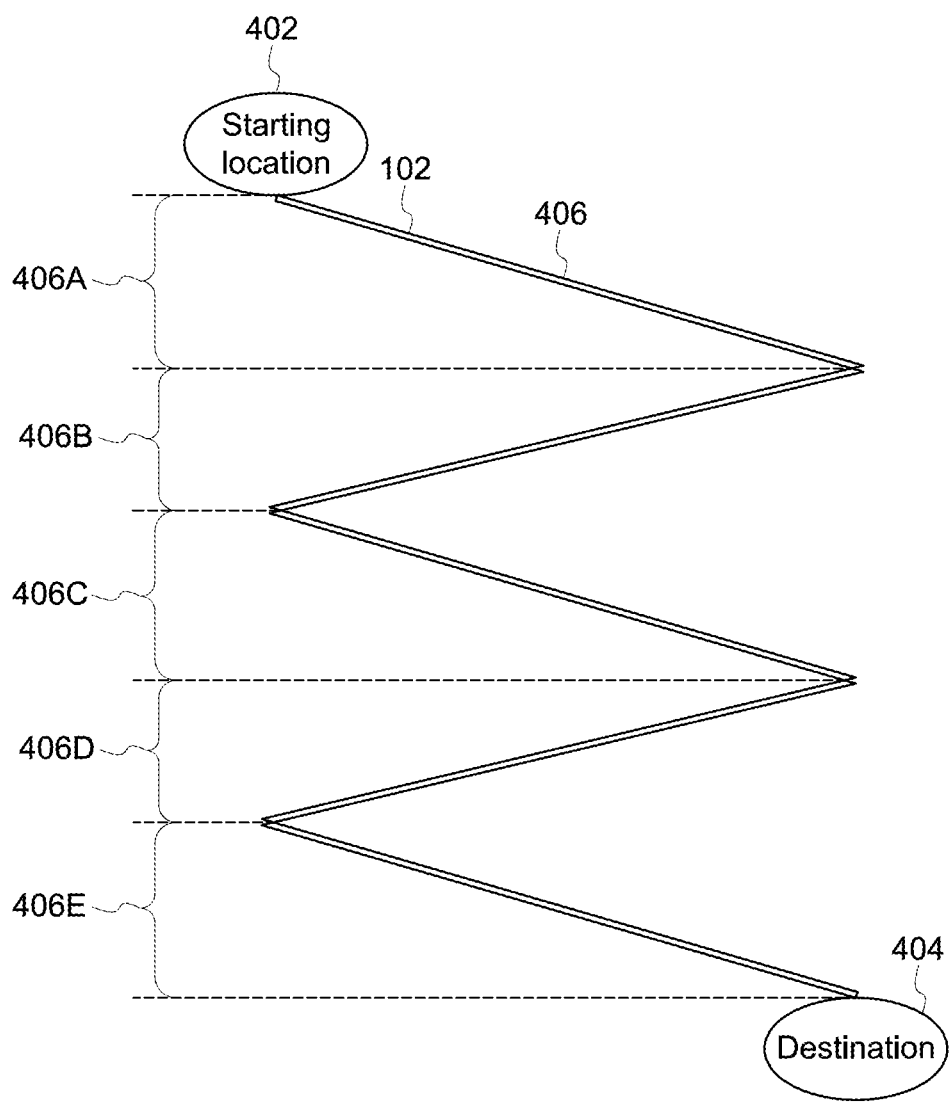
FIG. 4 illustrates a route for a trip of a vehicle system according to an embodiment.

FIG. 4 illustrates a route 102 for a trip of a vehicle system according to an embodiment. The route 102 extends from a starting location 402 to a destination location 404. The distance between the starting location 402 to the destination location 404 along the route 102 may be hundreds of miles, as described above. Due to the long distance of the route 102, the route 102 can be divided into multiple segments or geographic areas 406. The length of each geographic area 406 may be miles long, such as ten miles, fifty miles, or one hundred miles. The different geographic areas 406 may or may not have the same length as one another. For example, the locations of the geographic areas 406 may be based, at least in part, on the locations of cities, towns, or even the locations of weather sensors along the route 102. In the illustrated embodiment, the route 102 includes five geographic areas 406A-E. During the trip, the vehicle system travels from the starting location 402 through the first geographic area 406A, then through the second geographic area 406B and subsequent geographic areas 406C-406E until reaching the destination 404. Due to the long distance of the route 102, the vehicle system may experience different environmental conditions, such as ambient temperature and pressure, while traveling through the different geographic areas 406A-E. For example, the route 102 may extend north from Texas to South Dakota, so the temperature in the first geographic area 406A in Texas is likely greater than the temperature in the fifth geographic area 406E in South Dakota.

As described herein, the environmental conditions, such as temperature, pressure, and air constituency, can affect the performance capability of an engine of the vehicle system. For example, the vehicle system may not be able to perform as well at hot ambient temperatures over 90° F. than at cool ambient temperatures (e.g., between 30° F. and 60° F.). Air constituency may refer to the make-up of the ambient air through which the vehicle system travels. The air constituency may include oxygen concentration, nitrogen oxide (e.g., NOx) concentration, smoke and particulate matter levels, and the like. The vehicle system may be able to perform better within ambient air that has a greater oxygen concentration than within ambient air with a reduced oxygen concentration.

The route of the vehicle system may include one or more tunnels or other airflow-restricted areas. Such airflow restricted areas may have poor environmental conditions for engine operation. For example, as a vehicle system with multiple propulsion vehicles travels through an airflow restricted area, following vehicles that follow preceding vehicles through the airflow restricted area may experience poorer air constituency levels (e.g., reduced air quality) than the air quality experienced by the preceding vehicles. The oxygen concentration in the air experienced by following vehicles decreases due to the use of oxygen by preceding vehicles for fuel combustion. The concentration of NOx, smoke, and other particulate matter in the air experienced by the following vehicles increases due to the exhaust gases generated by the preceding vehicles. The temperature of the ambient air experienced by the following vehicles increases due to the heat emitted by the preceding vehicles.

Since the environmental conditions affect the performance capability of the engine of the vehicle system, the environmental data is obtained in order to predict the effect that the environmental conditions will have on the vehicle system during the trip. Referring now back to the method 300 shown in FIG. 3, the environmental data can include historical data based on measured environmental conditions in previous years. The environmental data may include an average temperature, average pressure, average humidity, average air constituency levels (e.g., oxygen concentration, NOx concentration, etc.) and/or the like recorded within the different geographic areas 406A-E along the route 102. Optionally, the environmental data may include the geographic locations of tunnels or other known airflow-restricted areas along the route.

The environmental data is also classified based on the time of the year. The environmental data may be divided into monthly, weekly, or biweekly times of the year. For example, for a trip that is to occur in the second week of January, the environmental data that is obtained corresponds to the environmental conditions recorded at the different geographic areas 406A-E along the route 102 in previous months of January (for monthly), in the first two weeks of the year (for biweekly), or in the second week of the January (for weekly). The environmental data may include an average temperature range and an average pressure range. The average temperature range includes the average low temperature and the average high temperature for the given geographic area during the particular time of the year. Likewise, the average pressure range includes the average low pressure and the average high pressure based on the geographic area and time of the year.

The environmental data may be obtained from a database that stores historical environmental data, such as the environmental database 1136 at the dispatch facility 204. For example, the one or more processors 1126 of the energy management system 1108 may request the environmental data for the scheduled trip, and subsequently receive the requested environmental data, by using the communication device 1114 to communicate with the dispatch facility 204. Alternatively, the environmental data may be stored locally in the memory 1128 of the energy management system 1108.

The environmental data is used to provide spatial markers along the route 102 in a track database. For example, the track database includes information about the route 102 for the trip, including the starting location 402, the destination location 404, and the beginning and ending locations of each of the geographic areas 406A-E. For each geographic area 406A-E, the track database may include a spatial marker that identifies the environmental data for that geographic area 406 based on the time of year. For example, the spatial marker for the first geographic area 406A may include an average temperature range and an average pressure range for the specific time of the year that the trip is to occur. The average temperature range may be, for example, between 20 degrees Fahrenheit (F) and 60 degrees F., and the average pressure range may be, for example, between 11 pounds per square inch (psi) and 13 psi. The spatial markers for the other geographic areas 406B-E may have different average temperatures and/or different average pressures relative to the spatial marker of the first geographic area 406A (and each other). The track database optionally may be stored in the memory 1128 of the energy management system 1108.

At 306, power output capability ranges for the vehicle system traveling through the geographic areas 406A-E during the trip are determined. A corresponding power output capability range is determined for each of the geographic areas 406A-E along the route 102. The power output capability ranges are determined based on vehicle characteristics of the vehicle system and the environmental data in each of the spatial markers. For example, the vehicle characteristics may include the type of engine(s) in the propulsion system 1112, specifications of the engine(s) (e.g., the rated power output capabilities (horsepower) thereof), and/or the like. Optionally, additional vehicle characteristics may be used to determine the power output capability range, such as a health, age, or condition of the engine(s). The power output capability ranges may also be determined based on field experience (e.g., information obtained during one or more earlier trips) and analysis, as described herein.

The power output capability range includes at least one power output upper limit for an engine of the vehicle 106. For example, the power output upper limit may be determined to be 4300 kW, so the power output capability range is a range between a lower limit, such as 0 kW, and the upper limit of 4300 kW. The power output capability range represents a range of power outputs that the engine is determined to be able to provide within the particular geographic area 406 as the vehicle system 100 travels through the area during the trip. For example, the power output capability range for each geographic area 406 is based on performance (e.g., expected and/or historical performance) of the engine through the particular geographic area 406 when exposed to ambient temperatures within the average temperature range and ambient pressures within the average pressure range for that geographic area 406 during the time of the year of the trip. The power output capability ranges account for variations in performance capability of the engines due to the differing environmental conditions experienced by the vehicle system while traveling through the different geographic areas 406. For example, the power output upper limit represents a power output that the propulsion system 1112 of the propulsion-generating vehicle 106 is predicted to be capable of achieving in the conditions, even though that power output may be lower than a rated power output which the propulsion system 1112 is designed to achieve. For example, the engine of the propulsion system 1112 may be rated for a power output of 4500 kW, but the power output capability range for the engine based on a given geographic area 406 during a given time of the year may be determined to have a power output upper limit of 4400 kW due to the conditions.

In an embodiment, the one or more processors are configured to determine the power output capability range using an engine performance map that corresponds to the one or more engines of the propulsion system 1112 of the vehicle 106. FIG. 5 is a table illustrating an engine performance map 502 for an engine of the propulsion system 1112 of the vehicle 106. The engine performance map 502 may be stored in the memory 1128 of the energy management system 1108, or alternatively may be stored in the memory 1106 of the vehicle controller 1102 or in the memory 1134 of the remote dispatch facility 204. The engine performance map 502 provides power output upper limits for an engine of the vehicle system based on corresponding temperature and pressure values derived from the environmental data. For example, the engine performance map 502 provides power output upper limits of the engine when exposed to different ambient temperatures and pressures.

In the table, the x-axis 504 (e.g., vertical columns) represents values of barometric pressures from the environmental data. The y-axis 506 (e.g., horizontal rows) represents values of turbo inlet air temperatures from the environmental data. The engine performance map 502 in FIG. 5 includes variables A, B, and C to represent three different temperature values, and the variables X, Y, and Z to represent three different pressure values. The cells 508 of the engine performance map 502 represent values of power output upper limits (e.g., horsepower), and are labeled in the map as (1), (2), (3), (4), (5), (6), (7), (8), and (9). The engine performance map 502 shown in FIG. 5 is provided as a general illustration to describe the layout of an engine performance map, such that an actual engine performance map would include quantitative values for the variables A-C, X-Z, and (1)-(9). An engine performance map typically includes more than three temperature values and pressure values in various embodiments. The engine performance map may be specific to the type of engine and/or type of propulsion-generating vehicle as the propulsion-generating vehicle 106 of the vehicle system 100.

The horsepower data that populates the cells 508 of the engine performance map 502 may be derived at least partially from field experience data, such as historical data from sensors that monitor engine performance during prior trips. For example, sensors on propulsion systems of vehicles may monitor ambient temperatures and pressures during a past trip, as well as both the actual power outputs provided by the engines of the propulsion systems and the desired or commanded power outputs. In a hypothetical example, the commanded power output of an engine may have been 4450 kW while a vehicle was traveling in an air temperature of 20 degrees F. and a pressure of 12 psi. If the propulsion sensors determine that the actual power output provided by the engine was only 4330 kW, then the engine experienced deration due to the environmental conditions and was not able to provide the desired power output. Based on this field experience, the 4330 kW that the engine was actually able to provide may be recorded in an engine performance map as a power output upper limit corresponding to the temperature of 20 degrees F. and the pressure of 12 psi. Referring to FIG. 5, the engine performance map 502 may be populated such that the variable X is 12 psi, the variable A is 20 degrees F., and the variable (1) is 4330 kW. The actual power output of an engine during a trip, such as the 4330 kW in the example above, may be measured and/or calculated using one or more sensors, such as a dynamometer, an electrical voltage sensor, an oxygen sensor, a mass air flow sensor, a position sensor, and/or the like. The temperature and pressure experienced by the vehicle during the trip may be monitored using corresponding sensors disposed onboard the vehicle, on wayside devices, or based on weather data that is received from a remote source, such as a weather center.

The engine performance map 502 is populated with data from various different past trips of vehicles with the same type (or at least a similar type) of engine and/or propulsion system as the vehicle 106. In an embodiment, the engine performance map 502 in FIG. 5 may correspond to an engine that is rated to produce 4500 kW. The power output upper limits in some of the cells 508 may be equal to 4500 kW, while the power output limits in other cells 508 may be less than 4500 kW, due to the environmental conditions. An engine performance map corresponding to a different engine or propulsion system would contain different populated values of the power output upper limits.

Optionally, some of the data in the engine performance map 502 may be calculated based on the recorded field experience data from the past trips of the same or similar vehicles. For example, some of the power output upper limit values may be extrapolated based on the recorded data. Optionally, the propulsion system 1112 of the vehicle 106 may be modeled using physics-based modeling to derive at least some of the power output upper limit values in the engine performance map.

The engine performance map provides a power output upper limit for each of various different air temperatures and pressures that may be experienced by the vehicle system 100 during a trip. For example, referring to the engine performance map 502, if the spatial marker associated with the first geographic area 406A of the route 102 indicates an average temperature value represented by variable B in the map 502 and an average pressure represented by variable Y in the map 502 at the time of the year that the vehicle system 100 will be traveling through the geographic area 406A during the trip, then the engine performance map 502 provides a power output upper limit value represented by variable (5). If the power output upper limit represented by variable (5) is 4380 kW, then the power output capability range for the vehicle system 100 traveling through the first geographic area 406A during the trip is determined to be between 0 and 4380 kW. The second geographic area 406B may have a different average temperature and/or average pressure at that time of the year relative to the first geographic area 406A, and therefore the power output upper limit (and power output capability range) for the second geographic area 406B, according to the engine performance map 502, may differ from the power output upper limit for the first geographic area 406A. Therefore, the engine performance map 502 is used to determine a respective power output capability range for each of the geographic areas 406A-E along the route 102.

Optionally, the power output capability range for a given geographic area may include multiple power output upper limits based on the environmental data. For example, since the environmental data for a given geographic area 406 may include a temperature range between a low temperature and a high temperature and/or a pressure range between a low pressure and a high pressure, multiple power output upper limits may be determined using the engine performance map 502 based on different combinations of the temperature and pressure boundary values. In a hypothetical example using the map 502, a temperature range is between values represented by variables A and C, and a pressure range is between values represented by variables X and Z. The engine performance map 502 provides four data points representing potential power output upper limits for these ranges including the variable (1) at the intersection of temperature A and pressure X, the variable (3) at the intersection of temperature A and pressure Z, the variable (7) at the intersection of temperature C and pressure X, and the variable (9) at the intersection of temperature C and pressure Z. It is possible that at least some of the power output upper limits represented by variables (1), (3), (7), and (9) may be the same. If all of the power output upper limits provided by the map 502 for the corresponding environmental data are the same, then that horsepower value may be used as the power output upper limit of the power output capability range. On the other hand, if at least some of the values represented by the variables (1), (3), (7), and (9) differ, then a power output upper limit may be determined by selecting one of these horsepower values or by using these horsepower values to calculate the power output upper limit.

In one embodiment, the power output capability range is conservatively determined to extend up to the lowest horsepower value represented by the variables (1), (3), (7), and (9) in the engine performance map 502. Hypothetically, the lowest horsepower value out of the values represented by the variables (1), (3), (7), and (9) may be 4150 kW. Therefore, by operating the vehicle system 100 during the trip without exceeding 4150 kW as the vehicle system 100 travels through the corresponding geographic area 406, then the propulsion system 1112 is expected to meet the power commands without experiencing any deration that would result in the propulsion system 1112 producing less than the requested power output.

In another embodiment, the power output capability range is liberally determined to extend up to the greatest horsepower value represented by the variables (1), (3), (7), and (9) in the engine performance map 502. Hypothetically, the greatest horsepower value out of the values represented by the variables (1), (3), (7), and (9) may be 4500 kW. By operating the vehicle system 100 with the upper limit of 4500 kW through the geographic area 406, the propulsion system 1112 may or may not experience deration, depending on the actual environmental conditions experienced during the trip. Although there is a risk that the engine may derate, the greater power output upper limit may result in better overall performance of the vehicle system 100 through the geographic area relative to the more conservative upper limit of 4150 kW. For example, the vehicle system 100 may travel faster through the area by abiding by the greater power output upper limit. In other embodiments, the power output capability range may be selected to extend to an intermediate horsepower value out of the values represented by the variables (1), (3), (7), and (9) in the engine performance map 502 and/or may extend to an upper limit calculated as an average or median of at least some of the horsepower values represented by the variables (1), (3), (7), and (9) in the engine performance map 502. For example, the power output capability range may be selected to extend to a power output upper limit calculated as the average between the greatest horsepower value of 4500 kW and the least horsepower value of 4150 kW, which is 4325 kW.

At 308, a trip plan is optionally provided for the trip of the vehicle system 100 along the route 102 based on the determined power output capability ranges of the various geographic areas 406A-E along the route 102. As described above, the trip plan designates operational settings, such as throttle settings and brake settings, for the vehicle 106 to control the movement of the vehicle system 100 during the trip. The operational settings correspond to the progression of the vehicle system 100 along the trip, such as the location of the vehicle system 100, the distance traveled, and/or a time elapsed since passing a designated location. In an embodiment, the trip plan is provided based on the power output upper limit of each of the power output capability ranges for the different geographic areas 406. The power output upper limits may be used as constraints, such that the throttle settings designated by the trip plan do not result in the power output of the propulsion system 1112 during the trip exceeding the power output upper limit for a corresponding geographic area 406. For example, the determined power output capability ranges include an upper limit of 4100 kW for the first geographic area 406A, an upper limit of 4450 kW for the second geographic area 406B, and an upper limit of 4300 kW for the third geographic area 406C. As a result, the trip plan is provided such that the designated throttle settings do not cause the power output of the vehicle 106 to exceed 4100 kW as the vehicle system 100 travels through the first geographic area 406A, the throttle settings do not cause the power output to exceed 4450 kW as the vehicle system 100 travels through the second geographic area 406B, and the throttle settings do not cause the power output to exceed 4300 kW as the vehicle system 100 travels through the third geographic area 406C. Therefore, the power output of the vehicle 106 when traveling in the second geographic area 406B may be controlled exceed the upper limit associated with the first geographic area 406A (e.g., 4100 kW) without concern of deration as long as the power output does not exceed the upper limit associated with the second geographic area 406B (e.g., 4450 kW). The trip plan may be provided by generating a new trip plan or selecting a previously-created trip plan from a group of stored trip plans. For example, a previously-created trip plan may be selected that meets the power output upper limit constraints for the different geographic areas 406 and also achieves other goals, such as arriving on time, reducing fuel consumption, and/or reducing total trip time.

At 310, the movement of the vehicle system 100 during the trip is controlled such that the vehicle system 100 (e.g., the vehicle 106 thereof) produces power outputs within the designated power output capability ranges associated with the different geographic areas 406. The vehicle system 100 is controlled to not exceed the corresponding power output upper limits as the vehicle system 100 travels through each of the geographic areas 406. Since the vehicle system 100 travels within the determined power output capability ranges, the propulsion system 1112 of each propulsion-generating vehicle 106 will be able to produce the commanded power outputs without experiencing deration events.

In an embodiment, the movement of the vehicle system 100 is controlled by communicating instructions in the form of control signals either to the vehicle controller 1102 or directly to the propulsion system 1112 of the vehicle 106. For example, the one or more processors 1126 of the energy management system 1108 may convey control signals that include designated operational settings (e.g., throttle and/or brake settings) to the propulsion system 1112 or to the vehicle controller 1102. The control signals may be automatically implemented by the vehicle controller 1102 and/or the propulsion system 1112 to control the movement of the vehicle system 100. In another embodiment, the instructions are contained within the trip plan, and the trip plan is communicated to the vehicle controller 1102 to control the movement of the vehicle system 100 during the trip. For example, the one or more processors 1126 of the energy management system 1108 may convey the generated or selected trip plan to the vehicle controller 1102, and the vehicle controller 1102 may implement the trip plan during the trip by transmitting control signals based on the trip plan to the propulsion system 1112.

In one embodiment, the steps 302, 304, 306, and 308 of the method 300 are performed prior to the vehicle system 100 starting the trip. For example, the power output capability ranges for the different geographic areas are determined based on environmental conditions that the vehicle system 100 is predicted to experience during the upcoming trip, and the trip plan is generated or selected prior to the trip. The trip plan may be revised or updated during the trip based on real-time feedback. In an alternative embodiment, at least some of the steps 302, 304, 306, and 308 of the method 300 may be performed after the vehicle system 100 has started moving along the route 102 during the trip, but before the vehicle system 100 travels through a designated geographic area. As the vehicle system 100 travels through the first geographic area 406A, the one or more processors 1126 of the energy management system 1108 may perform one or more of the steps 302, 304, 306, and 308 for upcoming geographic areas 406B-E along the route 102. For example, while the vehicle system 100 travels through the first geographic area 406A, the one or more processors 1126 may determine the power output capability range for the second geographic area 406B and/or create or select a trip plan for controlling the movement of the vehicle system 100 through the second area 406B.

Although in one embodiment the one or more processors 1126 of the energy management system 1108 onboard the vehicle 106 perform the entire method 300, in an alternative embodiment the one or more processors 1104 of the vehicle controller 1102 perform at least part of the method 300. For example, the one or more processors 1126 of the energy management system 1108 may only provide the trip plan at 308, and the one or more processors 1104 of the vehicle controller 1102 may perform the other steps of the method 300. In another alternative embodiment, the method 300 may be performed at least partially off-board the vehicle system 100, such as by the one or more processors 1132 at the dispatch facility 204. For example, the one or more processors 1132 may perform the entire method 300, and may control the movement of the vehicle system 100 during the trip at 310 by wirelessly communicating instructions, such as a trip plan or control signals, to the vehicle 106 via the communication device 1130. The instructions received may be implemented by the vehicle controller 1102 onboard the vehicle 106. In such an alternative embodiment, the vehicle 106 optionally may not have an onboard energy management system 1108, or at least does not use the energy management system 1108 to perform the method 300.

Figure 6:
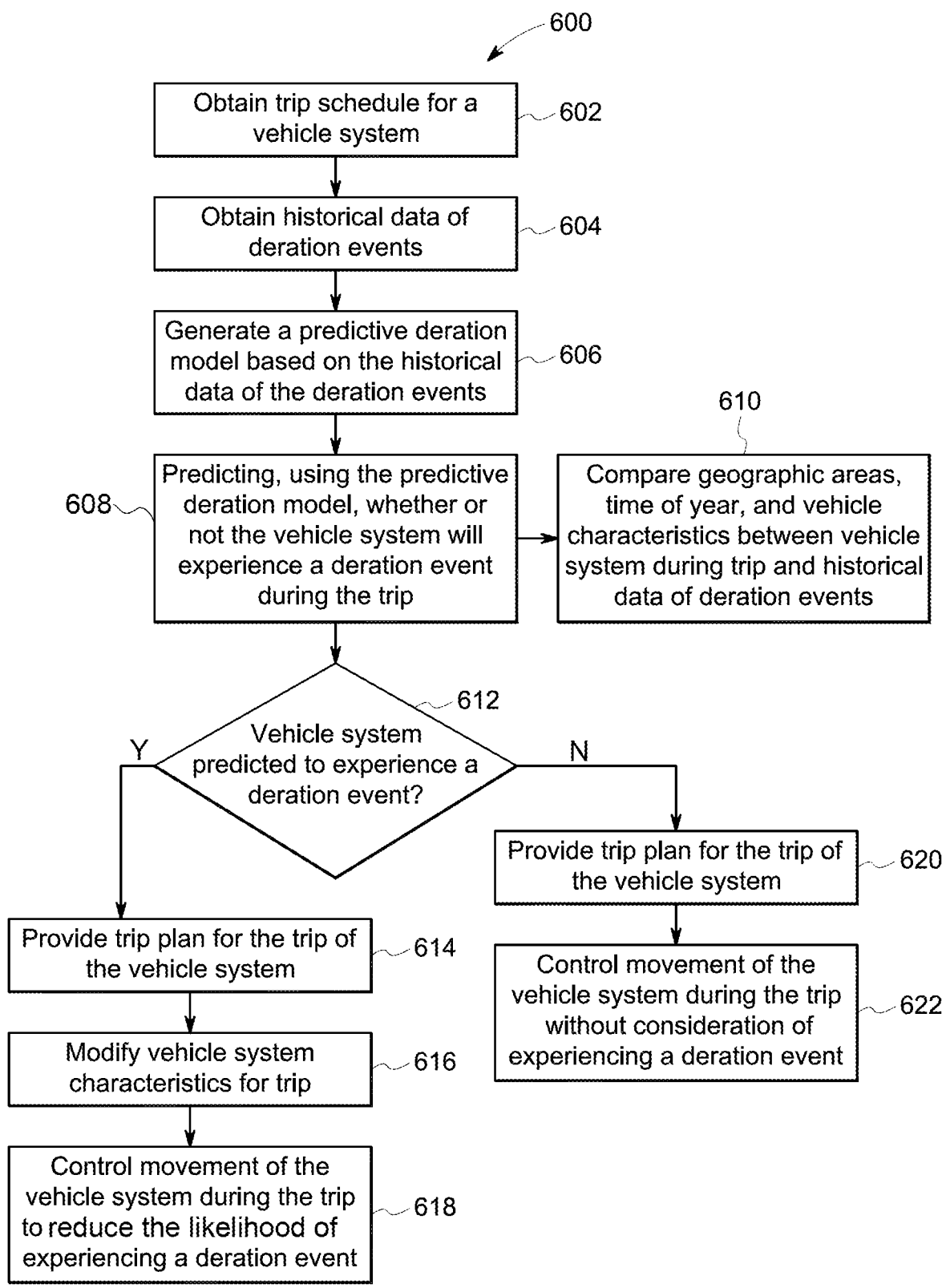
FIG. 6 is a flowchart of an embodiment of another method for controlling a vehicle system along a route during a trip.

FIG. 6 is a flowchart of an embodiment of another method 600 for controlling a vehicle system along a route during a trip. The method 600 is described in connection with the vehicle control system 202 as shown in FIG. 1. For example, in one embodiment the method 600 can be performed in full by the one or more processors 1126 of the energy management system 1108. In alternative embodiments, the method 600 can be performed in full or in part by the one or more processors 1104 of the vehicle controller 1102 and/or the one or more processors 1132 of the dispatch facility 204. Like the method 300 shown in FIG. 3, the method 600 is configured to control movement of the vehicle system 100 during a trip to reduce the likelihood of the engines derating during the trip, yielding better movement planning and vehicle handling during the trip relative to controlling the vehicle system without accounting for potential engine deration. However, the method 600 uses historical data of deration events experienced by vehicle systems during past trips, and does not use the environmental data that is used by the method 300.

At 602, a trip schedule is obtained for a scheduled trip of a vehicle system. The trip schedule identifies the route and the date that the trip occurs. At 604, historical data of deration events is obtained. The historical data includes information about actual engine deration that has occurred during past trips to various vehicle systems. The historical data may be obtained from a remote database, such as the diagnostic database 1138 in the memory 1134 at the dispatch facility 204. For example, for a group of vehicle systems that travel in a network, each time that a vehicle system in the group detects a deration event, that vehicle system may communicate information about the deration event remotely. The information is collected and stored in the diagnostic database 1138. A vehicle system may be configured to detect a deration event when the vehicle system determines that the actual power output provided by an engine or propulsion system of the vehicle system is less than a commanded power output. Optionally, since a nominal amount of engine performance variation is expected due to variables unrelated to deration, the vehicle systems may be configured to detect deration events when the difference between actual power output and the commanded power output exceeds a designated variance threshold. The variance threshold may be 5% of the commanded power output, 10% of the commanded power output, or the like.

When a vehicle system experiences a deration event, the information that is communicated and stored in the database may include vehicle characteristics that identify the vehicle system and trip characteristics that identify the trip, the route, the date that the deration event occurred, and the geographic location at which the deration event occurred. Optionally, the information that is logged may also include deration characteristics, such as the commanded power output during the deration event and the actual power output provided during the deration event. The vehicle characteristics may include additional information about the vehicle system, such as the type of engine(s), the type of propulsion system, the type of propulsion-generating vehicle, a rated power output capability of the derated engine, a number of the propulsion-generating vehicles in the vehicle system, a total weight of the vehicle system, a vehicle makeup of the vehicle system, and the like. The vehicle makeup may refer to the arrangement of the propulsion-generating vehicles relative to non-propulsion-generating vehicles in the vehicle system, the number and type of non-propulsion-generating vehicles, the type of cargo carried by the vehicle system, or the like.

Figure 7:
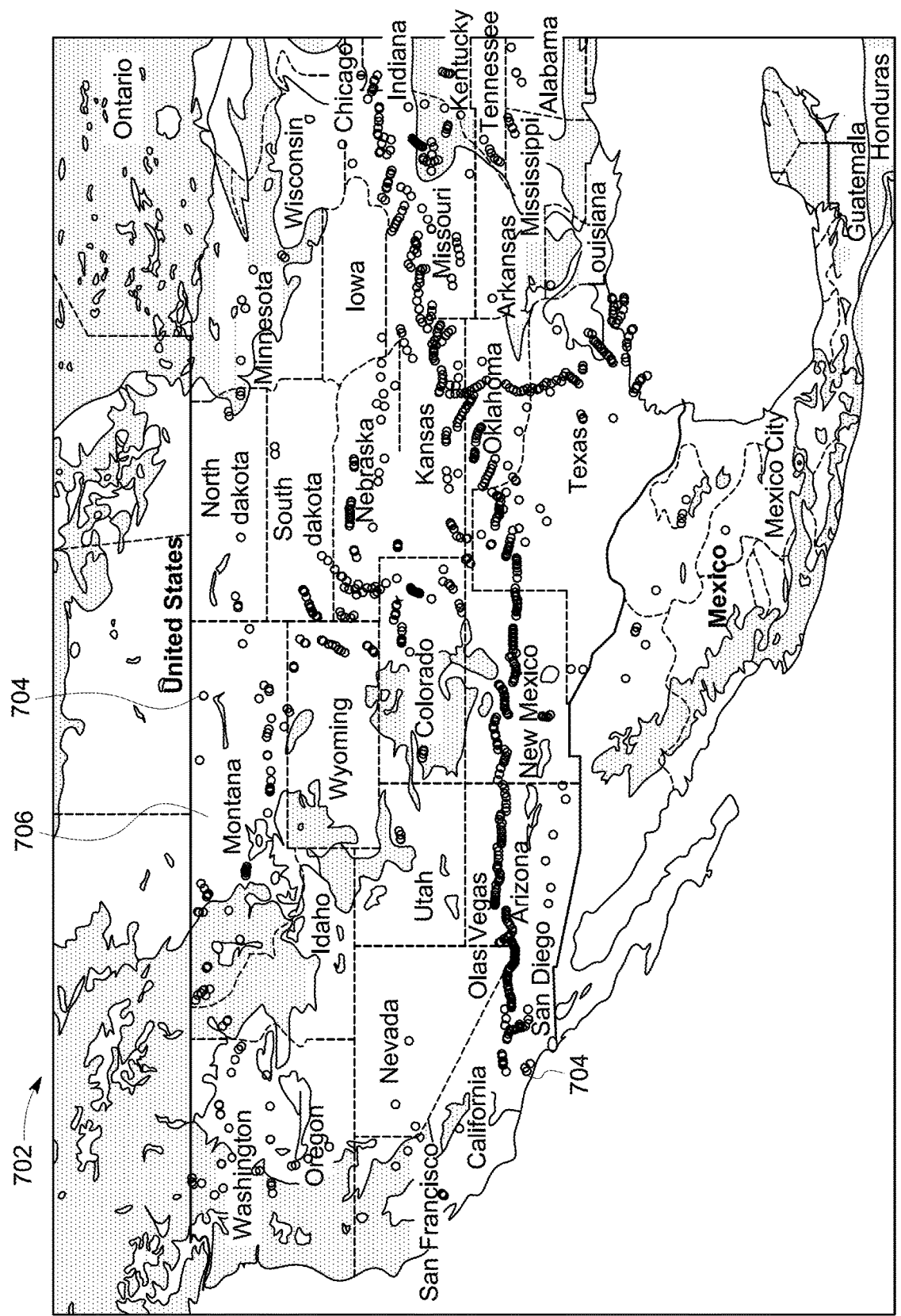
FIG. 7 illustrates a deration map that plots the locations of recorded deration events as event markers on a map of the United States.

In an embodiment, the network of vehicle systems from which the deration information is collected is a broad network. For example, the diagnostic database 1138 may collect and aggregate historical data of deration events from vehicle systems traveling throughout the contiguous United States, as wells as parts of Canada and Mexico. The number of deration events stored in the database 1138 may total in the thousands. The data may be collected over one or more years. FIG. 7 illustrates a deration map 702 that plots the locations of recorded deration events as event markers 704 on a map 706 of the United States. Each event marker 704 on the deration map 702 represents the geographic location in which one of the vehicle systems in the network experienced a deration event during a past trip. As shown in FIG. 7, some geographic areas include clusters of event markers 704 indicating a greater number or volume of derations events relative to other, less-clustered areas on the deration map 702. Although the deration map 702 in FIG. 7 only shows the geographic locations of recorded deration events, the deration map 702 optionally may include additional information about the deration events, such as the time of the year in which the deration events occurred. For example, the event markers 704 in an alternative embodiment may be color-coded based on the time of the year, such as the week, month, or season.

At 606, a predictive deration model is generated based on the historical data of the deration events. The predictive deration model is used to predict whether or not the vehicle system 100 will experience a deration event during an upcoming trip (or during an upcoming segment of a current trip).

In one embodiment, the historical deration events may be classified based on different categories, such as geographic area in which the deration event occurred, time of the year in which the deration event occurred, and vehicle characteristics of the vehicle system that experienced the deration event. At 610, the predictive deration model is used to compare the trip information of the vehicle system 100 to the deration events in the historical data by correlating the trip of the vehicle system 100 with the deration events with regard to the identified relevant categories. For example, the predictive deration model is used to compare the geographic areas 406A-E through which the vehicle system 100 will travel to the geographic locations where the deration events occurred in the past. The time of the year in which the trip of the vehicle system 100 is scheduled is also compared to the times of the year in which the recorded deration events occurred. Furthermore, the characteristics of the vehicle system 100 are compared to the vehicle characteristics of the vehicle systems that experienced deration events.

The predictive deration model may be a predictive analytical model that categorizes and compares the control data (e.g., the historical data of the deration events) to the variable data (e.g., the trip information of the vehicle system 100) to identify patterns, correlations and/or make predictions about whether the trip of the vehicle system 100 will be similar to the trips in the control data. Therefore, the predictive deration model may be used by inputting the trip information of the vehicle system 100, including the route 102 of the trip, the time of the year of the trip, and the vehicle characteristics, such as the type (e.g., brand, maker, or model number) of propulsion-generating vehicles 106 in the vehicle system 100.

The prediction of whether or not the vehicle system 100 will experience a deration event during the trip is based on a correlation between the trip information for the vehicle system 100 and the historical data of deration events. If the predictive deration model identifies one or more deration events in the historical data that match the trip information for the vehicle system 100 in all of the relevant categories analyzed, then it may be predicted that the vehicle system 100 will experience a deration event during the trip. For example, if three vehicle systems within the last two years experienced deration events while traveling through the first geographic area 406A of the route 102 during the same time of the year that the trip is to occur, and the vehicle systems included the same type of propulsion systems as the propulsion system 1112, then there is a high likelihood that the vehicle system 100 will also derate when traveling through the geographic area 406A. However, if the three vehicle systems all experienced the deration events in July when the air temperature is very hot, and the trip of the vehicle system 100 is scheduled for March when the air temperature is mild, then the prediction may be different because now only two of the three categories match between the scheduled trip and the historical deration events. For example, if no deration events in the historical data match the trip information for the upcoming trip of the vehicle system 100 in all relevant categories, then it may be predicted that the vehicle system 100 will not experience a deration event, or at least is less likely to experience a deration event than if there was a stronger correlation.

Although the predictive deration model is described above as comparing the trip information for the vehicle system 100 to the deration events in only three categories, optionally the vehicle characteristics category may be divided into multiple separate categories. For example, in addition to analyzing the type of engine or propulsion systems on the vehicle systems (which generally provides engine performance ratings), an addition category can be made for the total weight of the vehicle systems within certain weight ranges. Yet another category can be made for the vehicle makeup, such as whether the vehicle system is an intermodal vehicle or a unit vehicle.

Optionally, the trip may be segmented such that a separate prediction is made as to whether or not the vehicle system 100 will experience a deration event as the vehicle system 100 travels through each of the multiple geographic areas 406A-E along the route 102. It is possible that the vehicle system 100 is predicted to experience deration events in some areas 406 along the route 102 but not others.

At 612, if the vehicle system 100 is predicted to experience a deration event during the scheduled trip as the vehicle system 100 travels along the route 102 (even if only along one of the geographic areas 406A-E of the route 102), then flow proceeds to 614. At 614, a trip plan is provided for the trip of the vehicle system 100. The trip plan may be generated or selected in order to control the vehicle system 100 during the trip to prevent the vehicle system 100 from experiencing (or at least reduce a likelihood of the vehicle system 100 experiencing) the predicted deration event. As described above, the trip plan designates operational settings, such as throttle settings and brake settings, to control the movement of the vehicle system 100 during the trip. The trip plan may reduce the likelihood of the vehicle system 100 experiencing the predicted deration event by designating reduced throttle settings for when the vehicle system 100 travels through the one or more geographic areas 406A-E in which the vehicle system 100 is predicted to experience a deration event. The reduced throttle settings are relative to the throttle settings that would have been designated without accounting for the likelihood of deration.

At 616, the vehicle system characteristics may be modified for the trip of the vehicle system 100 in order to prevent or reduce the likelihood of the vehicle system 100 experiencing the deration event. For example, the type of propulsion-generating vehicle(s) 106 used in the vehicle system 100 may be changed to a different type that is better able to provide the commanded power output without derating. In another example, the number of propulsion-generating vehicles 106 in the vehicle system 100 that provide power output may be changed, such as to add one or more additional propulsion-generating vehicles 106 or activate a propulsion-generating vehicle 106 that is present in the vehicle system 100 but inactive (e.g., not providing power output).

At 618, the movement of the vehicle system 100 during the trip is controlled to reduce the likelihood of the vehicle system 100 experiencing the predicted one or more deration events. For example, the movement may be controlled to prevent or reduce the likelihood of experiencing the deration event(s) by redistributing designated power outputs that are to be provided by the different propulsion-generating vehicles 106 of the vehicle system 100. Thus, as the vehicle system 100 travels through a geographic area 406 in which the vehicle system 100 is predicted to experience a deration event, instead of a single vehicle 106 producing 4500 kW and predictably derating while a second vehicle 106 in the vehicle system 100 produces 3000 kW, the designated power outputs may be redistributed such that the first vehicle 106 produces 4000 kW and the second vehicle 106 produces 3500 kW. As a result, the total power output is the same and the first vehicle 106 is less likely to derate. In another example, the movement may be controlled to reduce the likelihood of experiencing the deration event(s) by controlling one or more of the propulsion-generating vehicles 106 to provide reduced power outputs relative to the outputs that would be provided without accounting for the risk of deration. Optionally, the reduced power output may be based on the historical data of the deration events. For example, the historical data may include the commanded power output as well as the actual power output provided by a propulsion-generating vehicle that experienced a deration event along the same geographic area and during the same time of the year as the trip of the vehicle system 100. Using this information, the movement of the vehicle system 100 through this geographic area may be controlled such that the propulsion-generating vehicle 106 is commanded to provide a power output that does not exceed the actual power output from the historical data, for example. By preventing the propulsion-generating vehicle 106 of the vehicle system 100 from exceeding the actual output that the vehicle was able to generate during the deration event, the propulsion-generating vehicle 106 may be unlikely to derate.

In an embodiment, the movement of the vehicle system 100 is controlled by communicating instructions in the form of control signals either to the vehicle controller 1102 or directly to the propulsion system 1112 of the vehicle 106. For example, the one or more processors 1126 of the energy management system 1108 may convey control signals that include designated operational settings (e.g., throttle and/or brake settings) to the propulsion system 1112 or to the vehicle controller 1102. The control signals may be automatically implemented by the vehicle controller 1102 and/or the propulsion system 1112 to control the movement of the vehicle system 100. In another embodiment, the instructions are contained within the trip plan, and the trip plan is communicated to the vehicle controller 1102 to control the movement of the vehicle system 100 during the trip. For example, the one or more processors 1126 of the energy management system 1108 may convey the generated or selected trip plan to the vehicle controller 1102, and the vehicle controller 1102 may implement the trip plan during the trip by transmitting control signals based on the trip plan to the propulsion system 1112.

Returning to 612, if it is determined that the vehicle system 100 is not predicted to experience a deration event during the trip, then flow continues to 620 and a trip plan is optionally provided for the trip of the vehicle system 100. The trip plan may be generated or selected from a pre-existing trip plan that is stored in a memory. At 622, the movement of the vehicle system 100 during the trip can be controlled without consideration of experiencing a deration event. For example, the movements may be controlled based on goals (e.g., meeting arrival times, reducing fuel consumption, and reducing total trip time, etc.), internal vehicle limitations (e.g., acceleration limits, power limits, etc.), and external constraints (e.g., speed limits), but are not controlled based on reducing the likelihood of experiencing deration events and therefore reducing the number of deration events experienced.

In one embodiment, the steps 602, 604, 606, 608, 612, 614, 616, and 620 of the method 600 are performed prior to the vehicle system 100 starting the trip. For example, the predictive deration model is used to predict whether or not the vehicle system 100 will experience a deration event along the trip, and the trip plan is generated or selected based on the prediction prior to the trip. The trip plan may be revised or updated during the trip based on real-time feedback. In an alternative embodiment, at least some of the steps 602, 604, 606, 608, 612, 614, 616, and 620 of the method 600 may be performed after the vehicle system 100 has started moving along the route 102 during the trip, but before the vehicle system 100 travels through a designated geographic area. For example, as the vehicle system 100 travels through the first geographic area 406A, the one or more processors 1126 of the energy management system 1108 may perform one or more of the steps 602, 604, 606, 608, 612, 614, 616, and 620 for upcoming geographic areas 406B-E along the route 102.

In one embodiment the one or more processors 1126 of the energy management system 1108 onboard the vehicle 106 perform the entire method 600. For example, the one or more processors 1126 obtain the historical data of the deration events and generate the predictive deration model based on the historical data. In an alternative embodiment, the predictive deration model is previously generated based on the historical data and is not generated by the one or more processors 1126 of the energy management system 1108. For example, the one or more processors 1126 access and utilize the predictive deration model, but do not perform the steps at 604 and 606 to generate the model or obtain the historical data used to create the model.

In another alternative embodiment, the one or more processors 1104 of the vehicle controller 1102 perform at least part of the method 600. For example, the one or more processors 1126 of the energy management system 1108 may only provide the trip plan at 614 and 620, and the one or more processors 1104 of the vehicle controller 1102 may perform the other steps of the method 600 (with the possible exception of steps 604 and 606). In yet another alternative embodiment, the method 600 may be performed at least partially off-board the vehicle system 100, such as by the one or more processors 1132 at the dispatch facility 204. For example, the one or more processors 1132 may perform the entire method 600, and may control the movement of the vehicle system 100 during the trip at 618 and 622 by wirelessly communicating instructions, such as a trip plan or control signals, to the vehicle 106 via the communication device 1130. The instructions received may be implemented by the vehicle controller 1102 onboard the vehicle 106. In such an alternative embodiment, the vehicle 106 optionally may not have an onboard energy management system 1108, or at least does not use the energy management system 1108 to perform the method 600.

One or more technical effects of the systems and methods described herein include reducing the occurrence of deration events during vehicle trips. Avoiding deration events has several advantages over vehicle systems that experience deration events during trips, including better control and handling of the vehicle system, an improved ability to plan the movement of the vehicle system, and an increased component operational lifetime. For example, deration events may apply certain stresses or strains on various components of the vehicle system, such that avoiding deration events may increase the operating life of the components and reduce maintenance and repair costs. Furthermore, avoiding deration events may improve fuel efficiency, as fuel is not wasted by supplying fuel to an engine that the engine cannot utilize to provide power.

In an embodiment, a system includes one or more processors configured to obtain environmental data geographically and temporally corresponding to scheduled travel of a vehicle system. The one or more processors are further configured to determine a power output capability range for the vehicle system traveling during a trip based on the environmental data that is obtained. The one or more processors are further configured to communicate instructions to at least one of a propulsion system of the vehicle system or a vehicle controller of the vehicle system for controlling movement of the vehicle system during the trip such that the vehicle system produces a power output within the power output capability range as the vehicle system travels. The environmental data includes historical values of one or more of temperature, pressure, or air constituency in geographic areas through which the vehicle system will travel during the trip.

Optionally, the one or more processors are configured to determine the power output capability range for the vehicle system traveling through the geographic areas before the vehicle system starts moving along a route for the trip.

Optionally, the one or more processors are configured to determine the power output capability range for the vehicle system traveling through the geographic areas after the vehicle system has started moving along a route for the trip and before the vehicle system travels through the geographic areas.

Optionally, the one or more processors are disposed onboard the vehicle system.

Optionally, the one or more processors are disposed off-board from the vehicle system. The one or more processors are configured to communicate instructions to control the movement of the vehicle system during the trip by wirelessly communicating one or more of a trip plan or control signals via a communication device.

Optionally, the one or more processors are further configured to generate or select a trip plan for the vehicle system based on the power output capability range that is determined. The trip plan designates operational settings for the vehicle system to control the movement of the vehicle system through the geographic areas during the trip.

Optionally, the power output capability range includes at least a first power output upper limit and a second power output upper limit. The one or more processors are configured to generate the trip plan using at least one of the first power output upper limit or the second power output upper limit as a constraint.

Optionally, the one or more processors are configured to determine the power output capability range using an engine performance map that is stored in a memory. The engine performance map provides at least one power output upper limit for an engine of the vehicle system based on corresponding historical values of temperature and pressure in the environmental data and field experience data representing monitored engine performance of the same vehicle system or similar vehicle systems during prior trips.

Optionally, the environmental data includes an average temperature range and an average pressure range for the geographic areas through which the vehicle system is scheduled to travel during a time of the year that the vehicle system is scheduled to travel through the geographic areas. The power output capability range is determined according to performance of the engine at ambient temperatures within the average temperature range and at ambient pressures within the average pressure range.

Optionally, the environmental data includes an average temperature range and an average pressure range during a time of the year for multiple geographic areas through which the vehicle system is scheduled to travel during the trip. The one or more processors are configured to determine multiple power output capability ranges for the vehicle system during the trip. Each of the power output capability ranges corresponds to one of the geographic areas.

Optionally, the environmental data is obtained from an off-board database.

In an embodiment, a system includes one or more processors configured to predict, using a predictive deration model, whether or not a first vehicle system scheduled to travel along a route during a trip will experience a deration event at a designated geographic area during the trip. The predictive deration model is generated based on historical data of deration events experienced by plural vehicle systems. The historical data includes geographic locations of the deration events, times of the year that the deration events were experienced, and vehicle characteristics of the vehicle systems that experienced the deration events. The one or more processors are further configured to communicate instructions to control movement of the first vehicle system during the trip based on the prediction such that the first vehicle system does not experience the deration event at the designated geographic area during the trip.

Optionally, the vehicle characteristics of the vehicle systems that experienced the deration events include one or more of types of propulsion-generating vehicles in the vehicle systems, rated power output capabilities of engines in the propulsion-generating vehicles, numbers of the propulsion-generating vehicles in the vehicle systems, total weights of the vehicle systems, and vehicle makeups of the vehicle systems.

Optionally, the one or more processors are configured to obtain the historical data of the deration events and generate the predictive deration model based on the historical data of the deration events.

Optionally, the one or more processors obtain the historical data of the deration events from a diagnostic database.

Optionally, the one or more processors are configured to predict whether or not the first vehicle system will experience a deration event at the designated geographic area during the trip by using the predictive deration model to compare a time of the year of the trip and vehicle characteristics of the first vehicle system with the times of the year that the deration events were experienced at the designated geographic area and the vehicle characteristics of the vehicle systems that experienced the deration events at the designated geographic area.

Optionally, the one or more processors are configured to use the predictive deration model to predict whether or not the first vehicle system will experience a deration event at any of multiple geographic areas through which the first vehicle system will travel during the trip.

Optionally, in response to predicting that the first vehicle system will experience a deration event at the designated geographic area during the trip, the one or more processors are configured to communicate instructions to one or more of change the type of propulsion-generating vehicle in the first vehicle system, change the number of propulsion-generating vehicles in the first vehicle system that provide power output as the first vehicle system travels through the designated geographic area, and redistribute designated power outputs to be provided by the propulsion-generating vehicles of the first vehicle system as the first vehicle system travels through the designated geographic area in order to reduce the likelihood of the first vehicle system experiencing the deration event at the designated geographic area during the trip.

Optionally, the historical data of the deration events that is used to generate the predictive deration model includes power outputs provided by the vehicle systems when the vehicle systems experienced the deration events. Responsive to predicting that the first vehicle system will experience a deration event at the designated geographic area during the trip, the one or more processors are configured to communicate instructions for the first vehicle system to provide a reduced power output when the vehicle system travels through the designated geographic area. The reduced power output is less than the power outputs provided by the vehicle systems that experienced the deration events.

Optionally, the one or more processors are further configured to generate or select a trip plan for the vehicle system based on the prediction of whether or not the first vehicle system will experience a deration event at the designated geographic area during the trip. The trip plan designates operational settings for the vehicle system to control the movement of the vehicle system through the designated geographic area during the trip.

Optionally, the one or more processors are configured to predict whether or not the first vehicle system will experience a deration event at the designated geographic area during the trip one or more of before the first vehicle system starts moving along the route during the trip or after the first vehicle system has started moving along the route during the trip but before the first vehicle system travels through the designated geographic area.

In an embodiment, a system includes one or more or more processors configured to obtain environmental data geographically and temporally corresponding to a scheduled trip of a vehicle system. The environmental data represents historical values of one or more of temperature, pressure, or air constituency in geographic areas through which the vehicle system will travel during the trip and a time of year during which the vehicle system is scheduled to travel through the geographic areas on the trip. The one or more processors are configured to determine power output capability ranges for the vehicle system during the trip based on the environmental data. Each power output capability range corresponds to a different one of the geographic areas through which the vehicle system will travel. The one or more processors are configured to communicate instructions to control movement of the vehicle system during the trip such that, as the vehicle system travels through the different geographic areas during the trip, the vehicle system produces power outputs that are within the power output capability ranges associated with the corresponding geographic areas.

Optionally, the one or more processors are further configured to generate or select a trip plan for the vehicle system based on the power output capability ranges that are determined. The trip plan designates operational settings for the vehicle system to control the movement of the vehicle system through the geographic areas during the trip.

Optionally, each power output capability range includes at least a first power output upper limit and a second power output upper limit. The one or more processors are configured to generate the trip plan using at least one of the first power output upper limit or the second power output upper limit as a constraint.

Optionally, the one or more processors are configured to determine the power output capability ranges using an engine performance map that is stored in a memory. The engine performance map provides at least one power output upper limit for an engine of the vehicle system based on corresponding historical values of temperature and pressure in the environmental data and field experience data representing monitored engine performance of the same vehicle system or similar vehicle systems during prior trips.

Optionally, the environmental data includes an average temperature range and an average pressure range for the geographic areas through which the vehicle system is scheduled to travel during a time of the year that the vehicle system is scheduled to travel through the geographic areas. The power output capability ranges are determined according to performance of the engine at ambient temperatures within the average temperature range and at ambient pressures within the average pressure range.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are example embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the inventive subject matter and also to enable a person of ordinary skill in the art to practice the embodiments of the inventive subject matter, including making and using any devices or systems and performing any incorporated methods. The patentable scope of the inventive subject matter is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be standalone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described systems and methods without departing from the spirit and scope of the inventive subject matter herein involved, it is intended that all of the subject matter of the above description or shown in the accompanying drawings shall be interpreted merely as examples illustrating the inventive concept herein and shall not be construed as limiting the inventive subject matter.

What is claimed is:

1. A system comprising:
   one or more processors configured to obtain environmental data geographically and temporally corresponding to scheduled travel of a vehicle system, the one or more processors further configured to determine a power output capability range for the vehicle system traveling during a trip based on the environmental data that is obtained, wherein the one or more processors are configured to communicate instructions to at least one of a propulsion system of the vehicle system or a vehicle controller of the vehicle system for controlling movement of the vehicle system during the trip such that the vehicle system produces a power output within the power output capability range as the vehicle system travels, wherein the environmental data includes historical values of an average temperature range and an average pressure range for multiple geographic areas through which the vehicle system is scheduled to travel on the trip during a time of the year that the trip is scheduled to occur, the one or more processors configured to determine multiple power output capability ranges for the vehicle system during the trip, each of the power output capability ranges corresponding to a different one of the geographic areas.

2. The system of claim 1, wherein the one or more processors are configured to determine the power output capability range for the vehicle system traveling through the geographic areas before the vehicle system starts moving along a route for the trip.

3. The system of claim 1, wherein the one or more processors are configured to determine the power output capability range for the vehicle system traveling through the geographic areas after the vehicle system has started moving along a route for the trip and before the vehicle system travels through the geographic areas.

4. The system of claim 1, wherein the one or more processors are disposed onboard the vehicle system.

5. The system of claim 1, wherein the one or more processors are disposed off-board from the vehicle system, the one or more processors configured to communicate instructions to control the movement of the vehicle system during the trip by wirelessly communicating one or more of a trip plan or control signals via a communication device.

6. The system of claim 1, wherein the one or more processors are further configured to generate or select a trip plan for the vehicle system based on the power output capability range that is determined, the trip plan designating operational settings for the vehicle system to control the movement of the vehicle system through the geographic areas during the trip.

7. The system of claim 6, wherein the power output capability range includes at least a first power output upper limit and a second power output upper limit, wherein the one or more processors are configured to generate the trip plan using at least one of the first power output upper limit or the second power output upper limit as a constraint.

8. The system of claim 1, wherein the one or more processors are configured to determine the power output capability range using an engine performance map that is stored in a memory, the engine performance map providing at least one power output upper limit for an engine of the vehicle system based on the historical values in the environmental data and field experience data representing monitored engine performance of the same vehicle system or similar vehicle systems during prior trips.

9. The system of claim 1, wherein the environmental data is obtained from an off-board database.

10. The system of claim 1, wherein the historical values are based on measured environmental conditions in previous years.

11. The system of claim 1, wherein the one or more processors are also configured to determine the power output capability range for the vehicle system based on vehicle characteristics of the vehicle system including one or more of a type of engine of the vehicle system, specifications of the engine, or a condition of the engine.

12. The system of claim 1, wherein the power output capability range includes a power output upper limit, the power output upper limit represents a power output that an engine of the vehicle system is predicted to be capable of achieving based on the historical values in the geographic areas through which the vehicle system is scheduled to travel during the trip.

13. A system comprising:

one or more processors configured to obtain environmental data geographically and temporally corresponding to scheduled travel of a vehicle system, the one or more processors further configured to determine a power output capability range for the vehicle system traveling during a trip based on the environmental data that is obtained, wherein the one or more processors are configured to communicate instructions to at least one of a propulsion system of the vehicle system or a vehicle controller of the vehicle system for controlling movement of the vehicle system during the trip such that the vehicle system produces a power output within the power output capability range as the vehicle system travels, wherein the environmental data includes historical values of an average temperature range and an average pressure range for geographic areas through which the vehicle system is scheduled to travel during a time of the year that the vehicle system is scheduled to travel through the geographic areas, the power output capability range determined according to performance of an engine of the vehicle system at ambient temperatures within the average temperature range and at ambient pressures within the average pressure range.

14. A system comprising:

one or more processors configured to obtain environmental data geographically and temporally corresponding to a scheduled trip of a vehicle system, the environmental data representing historical values of an average temperature range and an average pressure range for geographic areas through which the vehicle system is scheduled to travel on the trip and during a time of year that the trip is scheduled to occur, wherein the one or more processors are configured to determine power output capability ranges for the vehicle system during the trip based on the environmental data, wherein each power output capability range corresponds to a different one of the geographic areas through which the vehicle system will travel and is determined according to performance of an engine of the vehicle system at ambient temperatures within the average temperature range and at ambient pressures within the average pressure range, wherein the one or more processors are configured to communicate instructions to control movement of the vehicle system during the trip such that, as the vehicle system travels through the different geographic areas during the trip, the vehicle system produces power outputs that are within the power output capability ranges associated with the corresponding geographic areas.

15. The system of claim 14, wherein the one or more processors are configured to determine the power output capability ranges using an engine performance map that is stored in a memory, the engine performance map providing at least one power output upper limit for the engine of the vehicle system based on the historical values in the environmental data and field experience data representing monitored engine performance of the same vehicle system or similar vehicle systems during prior trips.

16. The system of claim 14, wherein the historical values are based on measured environmental conditions in previous years.

17. A system comprising:
one or more processors configured to obtain environmental data geographically and temporally corresponding to a trip of a vehicle system, the environment data including a respective average temperature range for each of multiple geographic areas through which the vehicle system is scheduled to travel during the trip, wherein the average temperature ranges are based on measured environmental conditions in previous years,
wherein the one or more processors are configured to determine a respective power output upper limit for the vehicle system for each of the multiple geographic areas based at least in part on the average temperature range for the corresponding geographic area, and to control movement of the vehicle system during the trip by restricting the vehicle system from exceeding the respective power output upper limit corresponding to the geographic area within which the vehicle system is traveling.

18. The system of claim 17, wherein the environment data also includes a respective average pressure range for each of the geographic areas, and the average pressure ranges are also based on measured environmental conditions in previous years.

19. The system of claim 17, wherein the one or more processors are further configured to generate or select a trip plan for the vehicle system based on the power output upper limits for the multiple geographic areas, the trip plan designating tractive and braking settings to control the movement of the vehicle system through the geographic areas during the trip.

20. The system of claim 17, wherein the one or more processors are configured to determine the power output upper limits using an engine performance map that is stored in a memory, the engine performance map including field experience data representing monitored engine performance of the same vehicle system or similar vehicle systems during prior trips.

* * * * *